United States Patent [19]

Robinson et al.

[11] Patent Number: 5,263,143
[45] Date of Patent: Nov. 16, 1993

[54] REAL TIME PROBE DEVICE FOR INTERNALS OF SIGNAL PROCESSOR

[75] Inventors: Jeffrey I. Robinson, New Fairfield, Conn.; Keith Rouse, Lebanon, N.J.; Terry F. Montlick, Bethlehem, Conn.

[73] Assignee: Star Semiconductor Corporation, Warren, N.J.

[21] Appl. No.: 34,586

[22] Filed: Mar. 22, 1993

Related U.S. Application Data

[60] Continuation of Ser. No. 663,395, Mar. 1, 1991, abandoned, which is a division of Ser. No. 525,997, May 18, 1990, Pat. No. 5,040,957, which is a continuation-in-part of Ser. No. 217,616, Jul. 11, 1988, abandoned.

[51] Int. Cl.⁵ .................................. G06F 11/00
[52] U.S. Cl. ............................. 395/425; 395/575; 364/DIG. 1; 371/21.1
[58] Field of Search ... 364/200 MS File, 900 MS File; 395/400 MS, 425 MS

[56] References Cited

U.S. PATENT DOCUMENTS

| | | | |
|---|---|---|---|
| 4,193,123 | 3/1980 | Meinke | 364/900 |
| 4,231,087 | 10/1980 | Hunsberger et al. | 364/200 |
| 4,315,313 | 2/1982 | Armstrong et al. | 371/16.2 |
| 4,371,952 | 2/1983 | Schuck | 371/16.1 |
| 4,410,984 | 10/1983 | Negi et al. | 371/16.1 |
| 4,414,665 | 11/1983 | Kimura et al. | 371/21.2 |
| 4,435,759 | 3/1984 | Baum et al. | 364/200 |
| 4,464,750 | 8/1984 | Tatematsu | 371/21.2 |
| 4,581,738 | 4/1986 | Miller et al. | 371/16.1 |
| 4,604,683 | 8/1986 | Russ et al. | 364/200 |
| 4,608,693 | 8/1986 | Baranyai et al. | 371/49.2 |
| 4,611,281 | 9/1986 | Suko et al. | 371/16.1 |
| 4,626,985 | 12/1986 | Briggs | 364/200 |
| 4,674,089 | 6/1987 | Poret et al. | 364/200 |
| 4,783,782 | 11/1988 | Morton | 371/11.3 |
| 4,788,684 | 11/1988 | Kawaguchi et al. | 371/21.2 |
| 4,835,774 | 5/1989 | Ooshima et al. | 371/21.2 |
| 4,888,772 | 12/1989 | Tanigawa | 371/21.2 |

*Primary Examiner*—Joseph L. Dixon
*Assistant Examiner*—Reba I. Elmore
*Attorney, Agent, or Firm*—David P. Gordon

[57] ABSTRACT

A real time probe device is provided for a digital signal processor having a multiported data RAM, a time division multiplexed data RAM bus, and a processor. The probe includes a programmable comparator coupled to the address lines of the data RAM bus for determining that data is being written to a location of the multiported data RAM specified by the programmable comparator, a circuit for receiving the data on the data lines of the data RAM bus and for writing the data to a data buffer in the multiported data RAM, a reading circuit for obtaining the data from the data buffer of the multiported data RAM, and preferably a digital to analog converter for receiving at regular intervals the data obtained from the multiported data RAM and providing an analog signal therefrom. The average data rate at which data is written to the buffer in the data RAM should be the same as the rate at which data is obtained from the buffer of the data RAM for D/A conversion. Preferably, the buffer of the multiported data RAM into which the data is written and read by the probe is of variable length depending upon the RAM address to be probed. In this manner, delay is kept to a minimum.

19 Claims, 6 Drawing Sheets

REAL TIME PROBE DEVICE FOR INTERNALS OF SIGNAL PROCESSOR

This is a continuation of co-pending application Ser. No. 07/663,395 filed on Mar. 1, 1991 now abandoned which is a divisional of copending U.S. Ser. No. 07/525,977 filed May 18, 1990 now U.S. Pat. No. 5,040,957, which is a continuation-in-part of copending U.S. Ser. No. 07/217,616 filed Jul. 11, 1988, now abandoned and of copending PCT US 89/02986 filed Jul. 10, 1989, all of which are hereby incorporated by reference in their entireties herein. This application is also related to copending U.S. Ser. No. 07/583,508 which is also incorporated by reference in its entirety herein.

BACKGROUND OF THE INVENTION

The present invention generally relates to programmable circuit devices. More particularly, the present invention relates o a probe device for probing a circuit realized in silicon as a signal processor. While the invention is not to be limited thereto, the invention does particularly relate to the probing of a customized signal processing device having a novel architecture.

Digital signal processing has evolved from being an expensive, esoteric science used primarily in military applications such as radar systems, image recognition, and the like, to a high growth technology which is used in consumer products such as digital audio and the compact disk. Single chip digital signal processors (SCDSPs) were introduced in the early 1980's to specifically address these markets. However, SCDSPs are complex to use, and have significant performance limitations. In particular, while the requirements of signal processing are such that the signal processor be computationally intensive and controllable and have low latency and low parasitic overhead for real time I/O, and be able to efficiently execute multiple asynchronous processes, the signal processors of the art art burdened with the interrupt structures and the memory intensiveness of their microprocessor ancestors. The interrupt structures found in the SCDSPs of the art typically result in the SCDSPs being limited to a frequency spectrum from DC to the low tens of KHz.

In overcoming the problems of the SCDSPs of the art, a digital signal processor (also referred to as a "SPROC") architecture was set forth in parent application Ser. No. 07/525,977, where the interrupt structure is completely removed from the schedule of the computing processor(s)—e.g. the general signal processors or "GSPs". The separation is achieved by providing a central memory unit (data RAM) through which flows substantially all the data coming into and out of the signal processor, by providing a data flow manager (DFM) which handles I/O between the central memory unit and the "outside" world, and by providing an effectively multiported RAM so that access to the RAM by circuitry other than the computing processor(s) does not impact on the computing of the computing processor(s). The computing processor(s) is coupled to the central memory unit and does not communicate directly with the outside world; rather the computing processor(s) communicates via the central memory unit.

With the provided architecture of Ser. No. 07/525,977, and an appropriate compiler as set forth therein, a "sketch and realize" function can be obtained where the SPROC is automatically programmed to assume the function of a circuit sketched on a screen. Thus, the SPROC becomes a custom SCDSP, with the GSP(s) programmed to perform the desired functions.

In the development and debugging of an analog circuit, it is particularly useful to be able to determine the signal exiting any component of the circuit. In the development and debugging of an integrated circuit such as a digital signal processor where analog circuits are implemented by the digital signal processor as microcode which is executed by the digital signal processor, such probing is typically not available. To the extent that it is possible to arrange the microcode such that a signal at a "location" is provided to an output for viewing on an oscilloscope, there are numerous drawbacks. First, since the microcode used for providing the signal is typically undesired in the final product, the microcode uses up final product memory. An attempt to remove the signal producing microcode and replace it with other useful code for the final product is fruitless, as signals resulting from the other useful code cannot then be viewed, and in the process of removing the signal producing microcode, additional "bugs" may result. Second, based on the structure of present day digital signal processors, the task of probing numerous locations for viewing at an output is a time consuming one which requires numerous interrupts of the digital signal processor. As a result, the digital signal processor cannot function in its intended capacity. Thus, the digital signal processors of the art are not capable of providing a probe function while the digital signal processor is up and running.

SUMMARY OF THE INVENTION

It is therefore an object of the invention to provide a probe device for a digital signal processor.

It is a further object of the invention to provide a probe device which is integral with the digital signal processor.

It is another object of the invention to provide a probe device for a digital signal processor which can be used in the development and debugging of the digital signal processor.

It is yet a further object of the invention to provide a probe device which is integral with a digital signal processor and which is used in the development and debugging of the digital signal processor with which it is integral.

An additional object of the invention is to provide a substantially real time probe device for a digital signal processor which does not interrupt the functioning of or flow of data through the digital signal processor.

Yet another object of the invention is to provide a real time probe device which is integral with a digital signal processor having an architecture which accommodates a "sketch and realize" function.

In accord with the objects of the invention, a substantially real time probe device for a digital signal processor having a multiported data RAM and a data RAM bus coupled thereto is provided and comprises: programmable comparator means coupled to the address lines of the data RAM bus for determining that data is being written to a location of the multiported data RAM specified by the programmable comparator means; means for receiving the data on the data lines of the data RAM bus and writing the data to a data buffer in the multiported data RAM; means for obtaining the data from the data buffer of the multiported data RAM; and a digital to analog converter for receiving at regular intervals the data obtained from the multiported data RAM and providing an analog signal therefrom. The average data rate at which data is written to the buffer in the data RAM should be the same as the rate at which data is obtained from the buffer of the data RAM for D/A conversion.

Preferably, the data bus accessing the data RAM is a time divisional multiplexed data bus, and the means for writing data to the multiported data RAM and the means for obtaining data from the multiported data RAM are provided with regular time slots on the data RAM bus. In this manner, access to the data RAM by one or more processors which are part of the digital signal processor is not interrupted. Also, preferably, the buffer of the multiported data RAM into which the data is written and read by the probe is of variable length depending upon the RAM address to be probed. In this manner, delay is kept to a minimum.

Additional objects and advantages of the invention will become evident upon reference to the detailed description taken in conjunction with the provided figures.

DETAILED DESCRIPTION OF THE PREFERRED EMBODIMENTS

Figure 1:
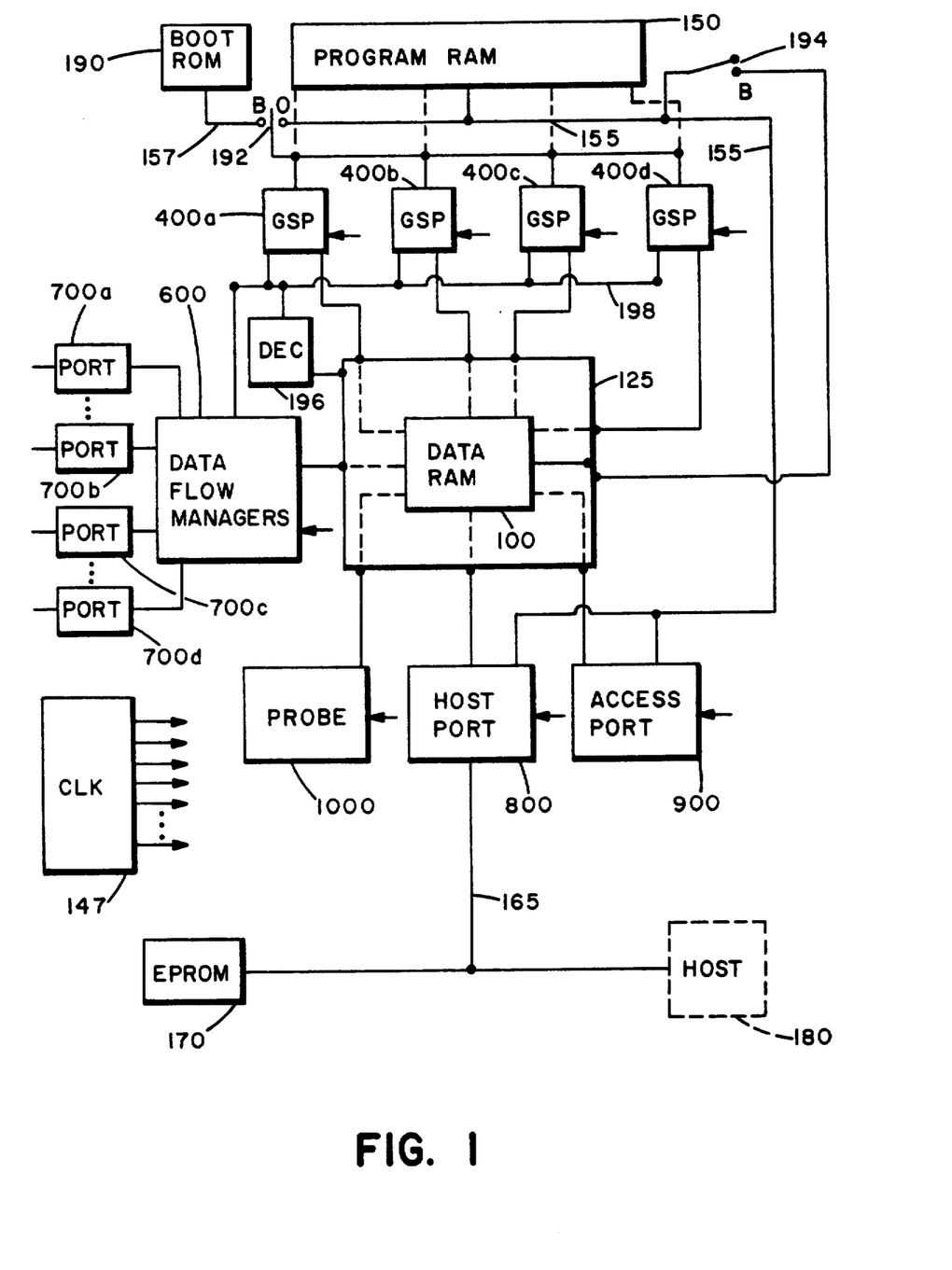
FIG. 1 is a high level block diagram of a SPROC device which includes the integrated probe of the invention.

A high level block diagram of the preferred SPROC subsystem 10 of which the probe of the invention is a part is seen in FIG. 1. The SPROC 10 preferably includes: a central "multiported" data RAM 100 accessed via data RAM bus 125 (multiported being broadly understood to include memories which are truly multiported as well as memory devices which appear to be multiported in that each device connected to the multiported memory believes that it has uncontested access to the multiported memory); a multiported program RAM 150 accessed via program RAM bus 155; a plurality of internal processors (GSP) 400 coupled to the data RAM bus 125 and the program RAM bus 155 and which perform general processing functions; a data flow manager (DFM) 600 which is coupled to the data RAM bus 125 and which generally controls the flow of data into and out of the SPROC and relieves the GSPs from dealing with that data flow; a plurality of serial data ports 700 coupled to the DFM 600; a host port 800 coupled to both the data RAM bus 125 and the program RAM bus 155, the host port serving to couple the SPROC via the host bus 165 to either an EPROM 170 in stand-alone mode or to a host processor 180 in host mode; an access port 900 coupled to both the data RAM bus 125 and the program RAM bus 155; a probe 1000 coupled to the data RAM bus 125; an internal boot ROM 190 with boot ROM bus 157 coupled via switch 192 to a GSP 400, the boot ROM 190 being used to control a master SPROC 10 in start-up mode, as well as to control the GSPs 400 of a SPROC 10 when the GSPs are in break mode; and a flag generating decoder 196 coupled via flag bus 198 to the DFM 600 and the GSPs 400 for flagging the DFM and GSPs when particular addresses of the data RAM 100 are being addressed (as determined by values on the data RAM bus 125).

The SPROC 10 can function in several different modes, some or which are determined by externally set pins (not shown). In particular, the SPROC 10 has a boot mode, an operational mode, and a development mode which includes a "break" mode. In addition, the SPROC may be a master SPROC or a slave SPROC which is either coupled to a master SPROC or a host 180. In the boot mode (powering up), where the SPROC 10 is a master, the SPROC 10 is required to program both itself and any other slave SPROCs which might be part of the system. To do that, upon power up, switches 192 and 194 are toggled to connect to the B (boot) nodes. With switches 192 and 194 so set, the boot ROM is coupled to a GSP 400 such as GSP 400a, and the program RAM 150 is coupled to the data RAM bus 125. As boot ROM 190 is coupled to the GSP 400a, the GSP 400a is able to read the boot code in boot ROM 190. The code is arranged to cause the GSP to seize control of the host port 800 and to load information into the SPROC from EPROM 170 via the host port 800. The information contained in EPROM 170 includes the program code for the program RAM 150 (which is sent via data RAM bus 125), configuration information for the DFM 600 and the serial, host, and access ports 700, 800, 900, and parameter information including initialization information for the data RAM 100. This information, which was compiled by the development system of the invention (as discussed in more detail hereinafter) and stored in the EPROM, causes the SPROC to perform the desired functions on data typically received via serial ports 700.

In boot mode, after the master SPROC is programmed, the remaining (slave) SPROCs of the system (not shown) are programmed by having the master SPROC 10 read the EPROM 170 and forward the information via the common host bus 165 to the other SPROCs which reside in different address spaces. The slave SPROCs do not require a boot ROM for boot mode purposes, although the boot ROM 190 is also used to control the break mode operation of the SPROC.

After initialization is completed, boot mode is exited by the writing of a predetermined value (f0H) to a predetermined memory address (0401H) which causes switch 192 to toggle to node O (operation), and switch 194 to toggle to an open position. Then the SPROC is ready to operate for its intended signal processing purposes.

Although slave SPROCs may be programmed in boot mode by a master SPROC, a slave SPROC may also be programmed by a microprocessor host such as host 180 of FIG. 1. In slave mode where a host such as host 180 is coupled to the host bus 165, the internal boot ROM 190 is not active. In fact, switches 192 and 194 are set in the operating mode position. In order to program the SPROC, the host 180 preferably utilizes the host bus 165 and sends program data (possibly obtained from EPROM 170) via host port 800, and program RAM bus 155 to the program RAM, and data RAM data via host port 800 and the data RAM bus 125 to the data RAM. Configuration information for the serial ports 700 and data flow manager 600, is sent by the host 180 via host port 800 and the data RAM bus 125 as described in the parent application hereof, U.S. Ser. No. 07/525,977.

In operational mode, serial data flow into and out of the SPROC 10 is primarily through the serial ports 700, while parallel data flows through the host port 800. Serial data which is to be processed is sent into an input port 700 which is coupled to the data flow manager 600, which in turn forwards the data to appropriate locations (buffers) in the data RAM 100. In certain circumstances, as described more fully in related application U.S Ser. No. 07/583,508, the DFM 600 will also write additional information to particular data RAM locations which are monitored by flag generating decoder 196. Decoder 196, in turn, causes the flags to be triggered over trigger or flag bus 198. Other flags are triggered by pulsing hardware pins (not shown) via lines called "compute lines". The hardware pins are particularly useful in providing external timing information to the GSPs 400 and the DFM 600 of the SPROC.

Once the data has been sent to the data RAM 100, and typically after the GSPs 400 have been apprised via the flag bus 198 of the arrival of the information, the GSPs 400 can process the data. The processing of the data is conducted in accord with one or more programs stored in the multiported program RAM 150 which in turn represents the functions, topology, and parameters of a schematic diagram generated by the user of the development system. In processing the data, the GSPs 400 can read from and write to the data RAM 100. However, in order to shield the GSPs from I/O functions which would interrupt and burden the GSPs, the GSPs do not address each other directly, and do not read from or write to the DFM 600 or the input or output serial ports 700. Similarly, the GSPs do not have direct access to the host port 800 or the access port 900. Thus, in order for the processed data to be output from the SPROC 10, the processed data must be sent by the GSP 400 to the data RAM 100. The data in the data RAM is then either read by the DFM 600 and sent out serially via an output port 700, or is sent out over the host bus 165 in a parallel form via the host port 800.

The development mode of the SPROC device is used prior to the final programming of the EPROM 170 and is basically utilized in conjunction with a host 180. The development mode permits a user to easily and advantageously develop an integrated circuit signal processor by permitting the user access to the internals of the SPROC device. For example, if during a test operational mode it is desirable to obtain a data "dump" of the registers of the GSPs, the GSPs 400 can be put into break mode by causing a GSP to write to memory address 406H. As a result of writing to that address, a decoder (not shown) causes switch 192 to toggle, and instructions from the break section of the boot ROM 190 are used by the GSP 400 via bus 157. While boot ROM 190 is coupled to the GSP 400 in this manner, the GSP runs a routine which causes each register of the GSP to dump its contents to predetermined locations in the data RAM 100. That data may then be accessed by the user and changed if desired via the access port 900 or host port 800. Then, the break section of boot ROM 190 reloads the data into the GSP, writes to memory address 407H, and another decoder (not shown) causes switch 192 to toggle again such that the program RAM 150 is coupled to GSP 400, and the program continues.

Other tools useful in the development mode of the SPROC device are the access port 900 and the probe 1000 of the invention. The access port permits the user to make changes to the program held in program RAM 150, and/or changes to parameters stored in the program RAM 150 or the data RAM 100 while the SPROC is operating. The probe 1000 permits the user to see internal signals generated by the SPROC in analog or digital form by monitoring the values of data written to any particular data RAM location. By using the access port 900 and the probe 1000 together, the effect of a change of a parameter value entered via the access port 900 may be immediately monitored by probe 1000.

Figure 2:
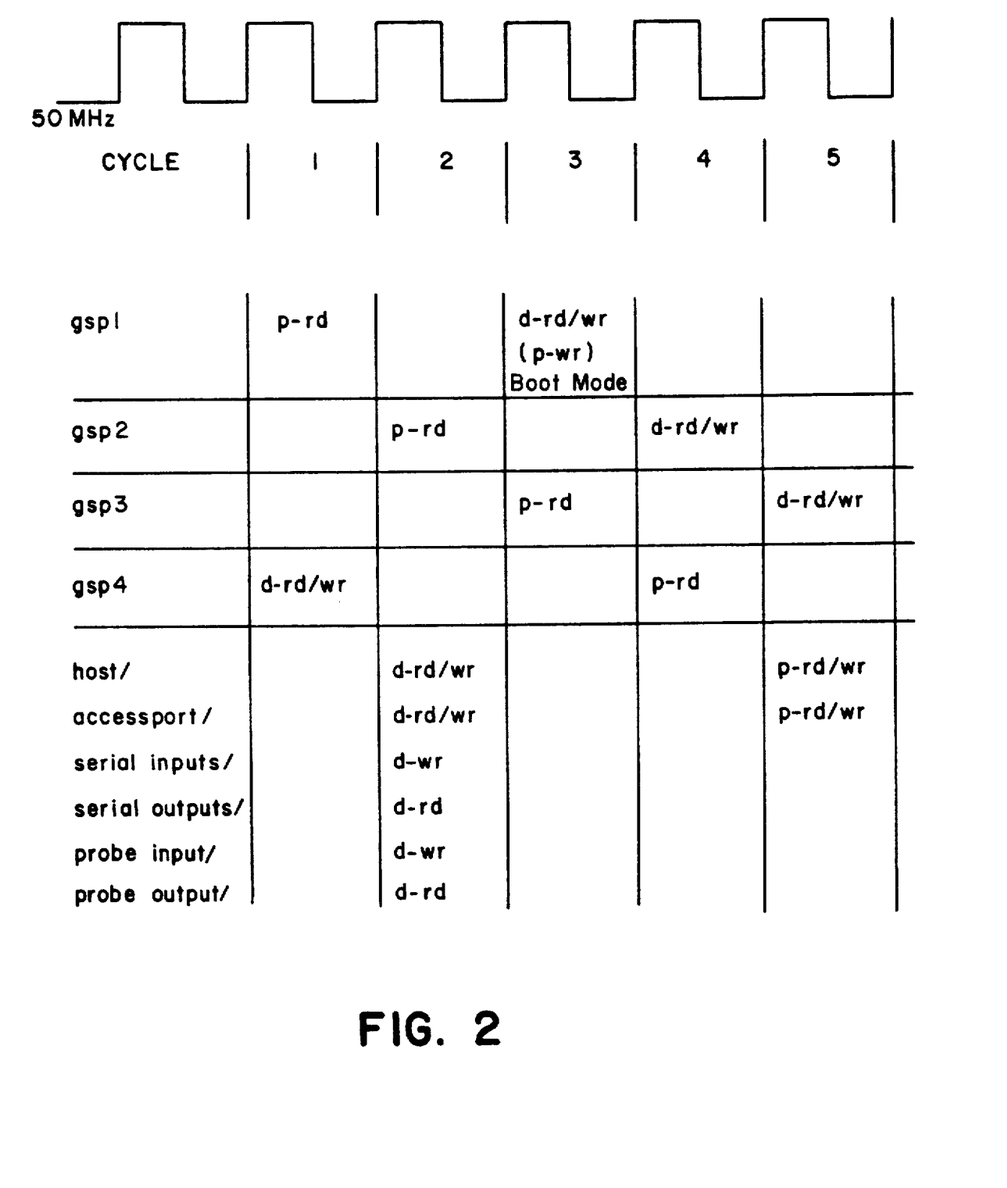
FIG. 2 is a timing diagram of the access of the various components and ports of the SPROC, including the integrated probe of the invention to the data RAM of the SPROC.

It should be appreciated that central to functioning of the SPROC is a multiported data RAM 100 and a multiported program RAM 150. The RAMs may either be multiported by time division multiplexing a single access to the RAMs (as seen by the solid lines of FIG. 1) or by providing true multiported RAMs (as suggested by the dashed lines of FIG. 1). As indicated in FIG. 2, in the preferred embodiment hereof, access to the program RAM 150 by the GSPs 400 and the host port 800 and access port 900 is via time division multiplexing of a single input. Similarly, access to the data RAM 100 by the GSPs 400, the DFM 600, the host port 800, the access port 900, and the probe 1000 is also via time division multiplexing of a single input.

As seen in FIG. 2, in a preferred embodiment, there are five principle time slots of the basic 50 MHz SPROC clock 147 (shown in FIG. 2): one for each GSP; and one shared by all of the other blocks of the SPROC. Each GSP 400 is able to read from the program RAM (p-rd) once over five clock cycles, effectively providing each GSP with a 10 MHz access to the program RAM 150. In the fifth clock cycle, the host is given preferred access to either read from or write to the memory. If the host does not need to read or write to the memory, the access port, the DFMs and the probe are given access. Alternatively, the host and access ports (i.e. the access port 900, probe 1000, and DFMs 600) can be given 50/50 access to the fifth time slot by additional time division multiplexing.

Figure 3:
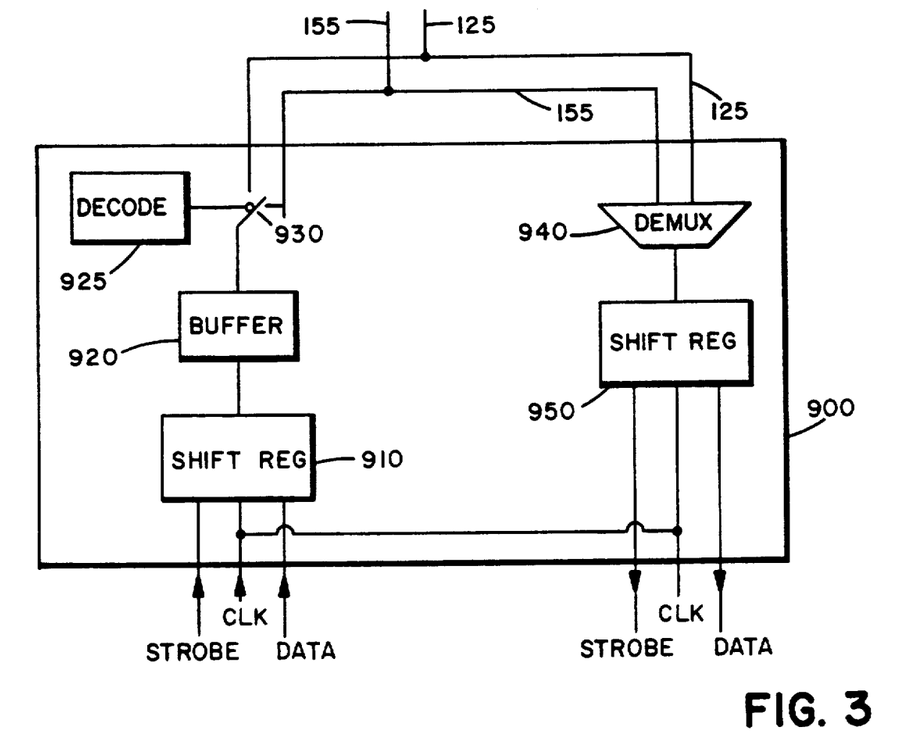
FIG. 3 a block diagram of the access port of the SPROC via which the integrated probe of the invention can be programmed.

As aforementioned, the access port 900 permits the user to make changes to the program data stored in RAM 150, and/or changes to other data stored in data RAM 100 while the SPROC is operating In other words, the access port 900 permits memory contents to be modified while the SPROC is running. In its preferred form, and as seen in FIG. 3, the access port 900 is comprised of a shift register 910, a buffer 920, a decoder 925, and a switch 930 on its input side, and a multiplexer 940 and a parallel load shift register 950 on its output side. On its input side, the access port 900 receives serial data as well as a clock and strobe signal from the development host computer. The data is arranged by the shift register 910 and stored in buffer 920 until the access port is granted time division access to the data RAM bus 125 or the program RAM bus 155. A determination as to which bus the data is to be written is made by decode block 925 which decodes the msbs of the address data stored in buffer 920. The decode block 925 in turn controls switch 930 which connects the buffer 920 to the appropriate bus. The msbs of the address data in the buffer 920 are indicative of which RAM for which the data is destined, as the data RAM and program RAM are given distinct address spaces, as described in the parent application hereto (U.S. Ser. No. 07/525,977). Likewise, because registers of the DFM, probe, host port, etc. are given distinct address spaces, those registers may be programmed by writing data from the access port 900 to the data bus 125.

On the output side, data received via the program RAM bus 155 or the data RAM bus 125 is forwarded via demultiplexer 940 to a shift register 950. The shift register 950 effects a parallel to serial conversion of the data so that serial data may be output together with an appropriate strobe and according to an external clock to a development host computer or the like.

By providing the ability to write and read data to the program and data RAMs, the access port 900 has several uses. First, by writing to a particular location (e.g. 406, or 408-40b Hex) in the data RAM, a program break can be initiated. The contents of the various registers of the GSPs which are written into data RAM as a result of the break can than be read. This information is particularly important in the debugging process. Second, if desired, the contents of the registers of the GSPs (as stored in the data RAM) can be modified prior to exiting the break mode by writing data to desired data RAM locations, thus providing an additional tool in the debugging process. Third, if desired, the program (including microinstructions and/or parameters stored as part of microinstructions) stored in the program RAM itself can be altered "on the fly", and can provide the developer with the ability to monitor (in conjunction with the probe 1000 hereinafter described) how a change in a parameter(s) or a change in the program could effect the functioning of the SPROC and, therefore, the functioning of the user's system.

Figure 4:
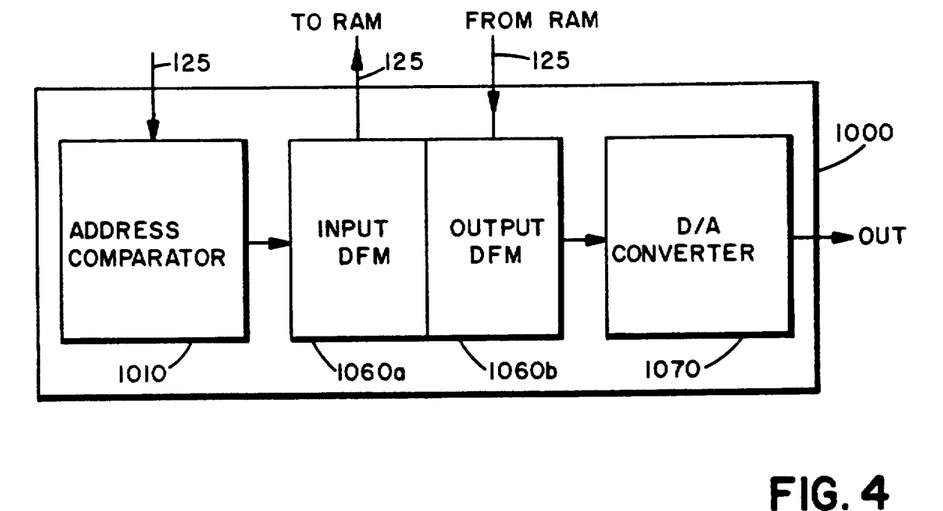
FIG. 4 is a high level block diagram of the integrated probe of the invention.

The probe 1000 of the invention is seen in FIG. 4. The probe 1000 permits the user to see internal signals generated by the SPROC by monitoring the data RAM bus 125 and capturing the values of data written to one or more data RAM locations. The probe 1000 is generally comprised of a programmable comparator 1010, a data flow manager 1060 with an input section 1060a and an output section 1060b substantially as described hereinafter with reference to FIGS. 5a and 5b, and a digital to analog converter 1070. The comparator 1010 is programmable (e.g. via data forwarded by a computer via the access port 900) such that any data RAM address may be monitored. The data RAM address is monitored by coupling the comparator 1010 to the data RAM bus 125 and comparing via XNOR gates (not shown) the programmed address to the addresses placed on the bus. When the addresses match, and it is determined that data is being written to the data RAM as opposed to being read from the data RAM, the data is read into the input DFM section 1060a (as well as into the data RAM). The input DFM section 1060a stores the data until the probe 1000 is granted access for writing data to the data RAM 100. At that time, the probe 1000 writes the data to its own buffer in the data RAM (i.e. a portion of the data RAM reserved for the probe 1000). When the robe 1000 is granted access for reading data from the data RAM 100, the output DFM section 1060b of the data probe 1000 pulls the data from its data RAM buffer at the rate set by the output DFM section's divide by N block, which must on the average equal the rate at which data is being written into the buffer. The data which is being retrieved by the output DFM 1060b at regular intervals is then forwarded to the D/A converter 1070 where it is converted into analog format so that it can be viewed on an oscilloscope, on a spectrum analyzer, on a RMS meter, etc. In this manner, signals which are being written to any data RAM location may be monitored substantially in real time as desired. By using the access port 900 and the probe 1000 together, the affect of a change of a parameter value (e.g. to a filter which is implemented via code in the program RAM) entered via the access port 900 may be immediately viewed as an analog signal via probe 1000.

As aforementioned, the probe 1000 includes a data flow manager (DFM) 1060 for receiving and temporarily storing a copy of data being sent to the address specified by the programmable address comparator 1010, for writing that data to a buffer in the data RAM set aside for the probe, for reading that data RAM buffer at a regular rate, and for forwarding the data to the D/A converter. Details of the input and output DFMs 1060a and 1060b of the probe 1000 are seen with reference to FIGS. 5a and 5b.

Figure 5A:
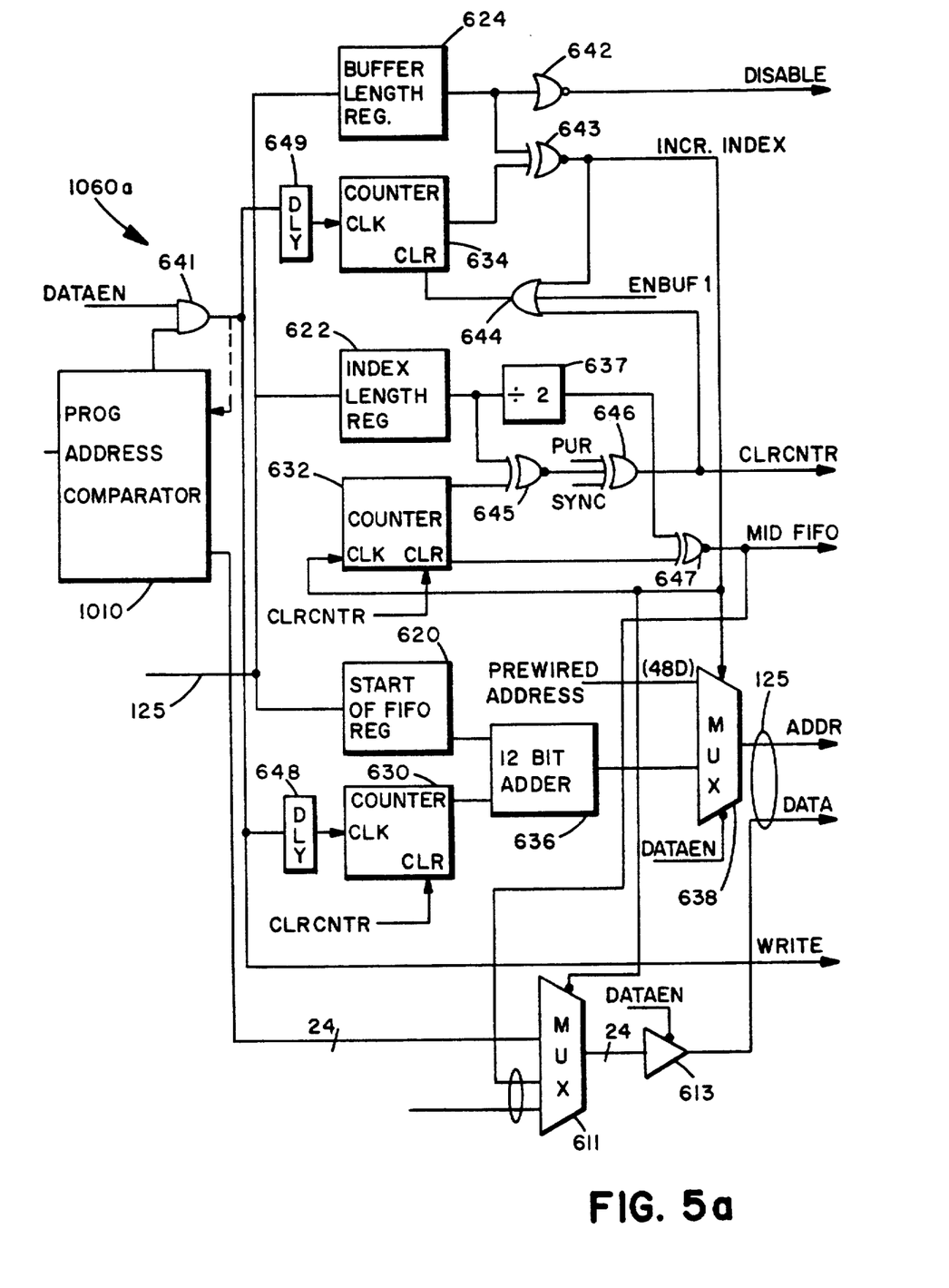
FIGS. 5a and 5b are block diagrams of the input and output integrated probe data flow managers of the invention.

The probe input DFM circuitry 1060a for receiving data from the address comparator 1010 and organizing it for storage in a FIFO of the data RAM 100 is seen in FIG. 5a. The data flow itself is simple, with the data being sent from the address comparator 1010, via multiplexer 611 and tristate driver 613 to the data slots of the data RAM bus 125. Multiplexer 611 permits either data coming from the programmable address comparator 1010 or data generated as hereinafter described to be forwarded to driver 613. Driver 613 is controlled as indicated such that data is only output on the data RAM bus 125 when the DFM 1060a is enabled by the system-wide multiplexer clock scheme.

Besides the data flow circuitry, the DFM 1060a is arranged with buffers, counters, gates, etc. to generate data RAM FIFO addresses for the incoming data. As shown in FIG. 5a, the DFM 1060a has three registers 620, 622, 624, three counters 630, 632, and 634 associated with the three registers, an adder 636, a divide by two block 637, a multiplexer 638, seven logic gates 641 642, 643, 644, 645, 646, and 647 (gates 642, 643, 645, and 647 being bus wide gates), and two delay blocks 648 and 649. The three registers are respectively: the start of FIFO register 620 which stores the start location in the data RAM for the FIFO to be addressed by the probe; the index length register 622 which stores the number of buffers which comprise the FIFO (for the FIFO of FIG. 5c, the index length register would be set at four), and the buffer length register 624 which stores the length of each buffer, i.e. the number of words that may be stored in each buffer (for the FIFO of FIG. 5c, the buffer length register would be set at eight). When a data word (twenty-four bits) is ready for sending to the data RAM for storage in a FIFO, the address comparator 1010 provides a ready signal which is used as a first input to AND gate 641. The second input to AND gate 641 is a data enable signal which is the time division multiplexed signal which permits the DFM to place a word on the data RAM bus. With the data enable and ready signals high, a high signal is output from the AND gate which causes driver 613 to output the data on the data RAM bus along with an address. The address is that which is computed by the twelve bit adder 636, or a prewired address, as will be described hereinafter.

When AND gate 641 provides a high output, the high output is delayed by delay blocks 648 and 649 before being input into clock counters 630 and 634. As a result, counters 630 and 634 increase their counts after an address has been output on the data RAM bus. When counter 630 increases its count, its count is added by the twelve bit adder 636 to the FIFO start location stored in register 620. If selected by multiplexer 638, the generated address will be the next address output in the address slots of the data RAM bus in conjunction with the data provided by driver 613. Thus, as data words continue to be sent by the address comparator 1010 for storing in the data RAM FIFO, they are sent to incremental addresses of the data RAM, as the counter 630 increasingly sends a higher value which is being added to the FIFO start location. As is hereinafter discussed, the counter 630 continues to increase its count until a clear counter signal is received from circuitry associated with the index length register 622. When the clear counter signal is received, the counter starts counting again from zero.

As aforementioned, each time the AND gate 641 provides a high output, the counter 634 associated with the buffer length register 624 is also incremented (after delay). The outputs of the buffer length register 624 and its associated counter 634 are provided to bus wide XNOR gate 643 which compares the values. When the counter 634 reaches the value stored in the buffer length register 24, a buffer in the data RAM FIFO has been filled. As a result, the output of XNOR gate 643 goes high, causing the three input OR gate 644 to pass a high signal to the reset of counter 634. The high signal from bus wide XNOR gate 643 is also fed to the counter 632 associated with the index length register 622, to the multiplexer 638, and to the multiplexer 611. As a result of the buffer being filled, multiplexer 638 enables the prewired address (48D Hex) to be placed in the address slots of the data RAM bus 125, along with one of two predetermined (or generated) data words which are generated as discussed below. The placement of the prewired address and a data word on the bus at the end of buffer signal occurs upon the next data enable signal received by the DFM 1060a, which is before another word is received by the programmable address comparator 1010 for sending to the data RAM 100. Also, the placement of the prewired address and data word is used for signaling that the FIFO is half full, at which time the mid-FIFO signal output from XNOR gate 647 is used as the msb input to the data bus mux 611.

As just stated, the predetermined or generated data word placed on the bus after a FIFO buffer has been filled preferably uses a "1" as the msb of the data word if the FIFO buffer that has been filled causes the FIFO to be half filled (as described hereinafter). Otherwise, a "0" is used as the msb. The remainder of the data word may be null information. This predetermined or generated data word is then passed via multiplexer 611 to driver 613 which places the data word on the bus at the same time the prewired address (48D) is placed on the data RAM bus 125.

As aforementioned, when an indication of a full buffer is output by bus wide XNOR gate 643, counter 632 is incremented. Counter 632 therefore tracks the number of the buffer in the FIFO that is being filled. When the number of the FIFO buffer being addressed (as determined by counter 632) is half of the FIFO length (as determined by the length stored in register 622, divided by divide by two block 637), a flag is raised by the DFM via the bus wide XNOR gate 647. The "mid FIFO" flag indicates that the buffer in the FIFO being written to is halfway through the FIFO. Hence, if all previous buffers in the FIFO are still full with data, the FIFO is half full. In addition, the mid FIFO flag causes the generated data input to multiplexer 611 to be changed, such that the msb of the data is a "1" instead of a zero. Thus, upon filling the buffer which causes the FIFO to be half filled, a slightly differently coded data word is placed in the data slots of the data RAM bus when the prewired address is selected.

When the value of counter 632 is incremented to the value stored in the index length register 622, the last location in the FIFO has been addressed. Accordingly, it is desirable to recirculate; i.e. to continue by addressing the first location in the FIFO. With the value of counter 632 equal to the value of register 622, bus wide XNOR gate 645 provides a high signal which is passed through the three input OR gate 646. As a result, counters 630, 632, and 634 are reset. As indicated in FIG. 5a, a "clear counter" signal may also be generated by a power up reset (PUR) signal which is generated by applying a signal to a predetermined pin (not shown) of the SPROC.

Figure 5B:
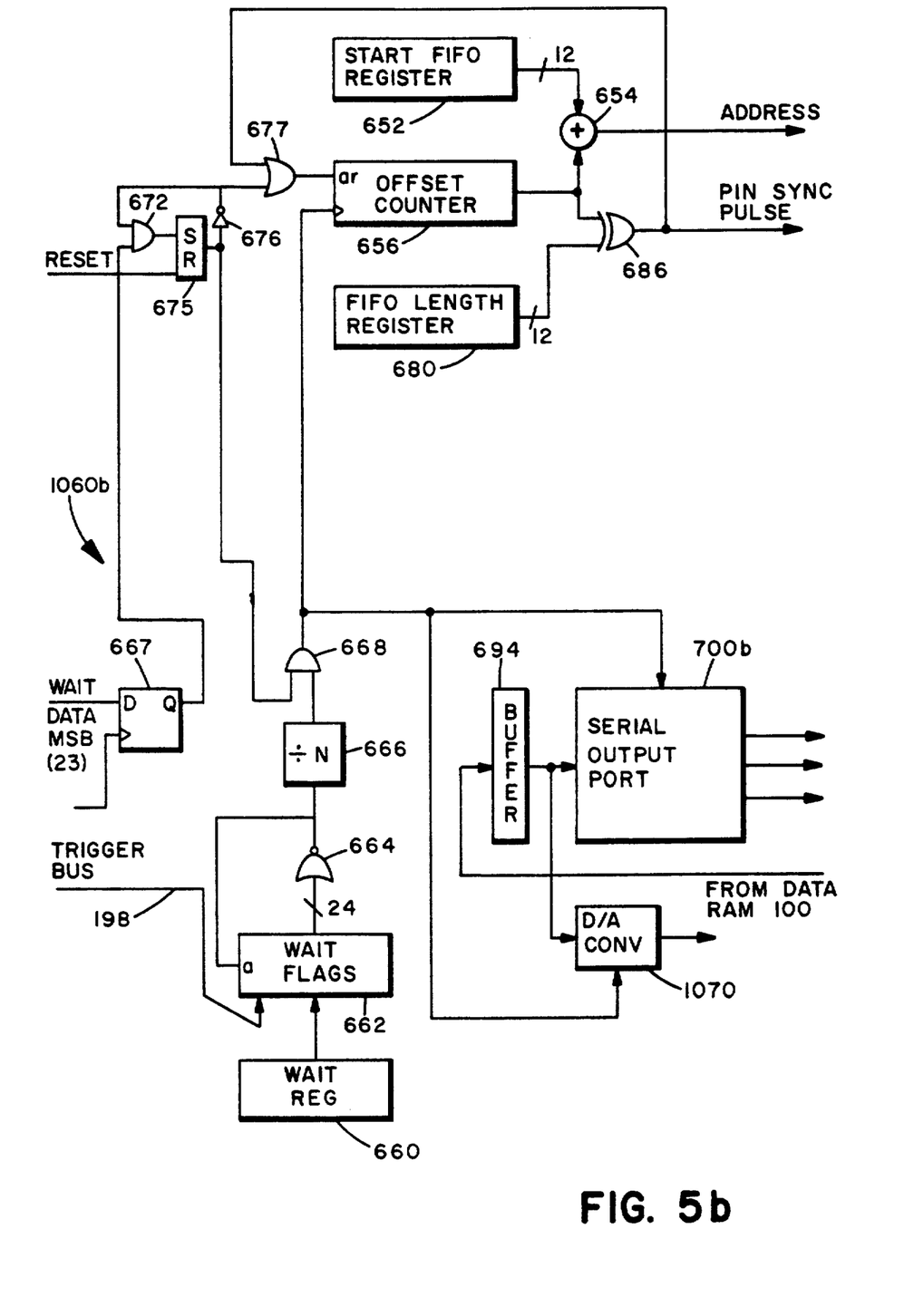

Turning to FIG. 5b, the output DFM 1060b of the probe 1000 is seen. The function of the output DFM is to take data in the FIFO, and organize it for output to the D/A converter output 1070 of probe 1000 of the SPROC apparatus.

The output DFM 1060b is preferably comprised of several registers and counters, logic elements including AND gates, comparators, and inverters, divide and add blocks, flip-flops, a buffer and a parallel to serial converter. Basically, the data flow through the output section DFM is simple. An address generated by the the start address register 652 is added by adder 654 to the value in the offset counter 656, and that address is output (via an enabled tristate driver—not shown) onto the address section of the data RAM bus. The data RAM receives the address information and then places the data located at that data RAM address on the data RAM bus. That data is received by the DFM 1060b and latched and stored in buffer 694 prior to being forwarded to the D/A converter 1070 of the probe 1000 and/or a serial output port 700b.

The remaining circuitry of FIG. 5b serves the function of not permitting the data to be forwarded to the D/A converter 1070 and/or serial output port 700b unless certain conditions (i.e. triggers) are met. In particular, DFM 1060b has a wait register 660 which holds flag information which must be cleared in the wait flag register 662 before a signal will be generated. The bits in the wait flag register are only cleared upon receipt of appropriate trigger bits received from the trigger bus 198. When the appropriate flags are cleared, bus wide NOR gate 664 resets the wait flag register 662 by permitting it to be reloaded from wait register 660. The NOR gate 664 also passes the signal on to divide by N (N=0, 1, ..., n) block. Upon the divide by N block 666 receiving N pulses from NOR gate 664, it outputs a pulse to AND gate 668. If N is one, no clock decimation occurs. However if N is greater than one, decimation is effected; i.e. the clock is reduced to match the decimation of data which occurred in the GSP. If the other input to AND gate 668, is also high (which occurs when the DFM is running as hereinafter described), a pulse is sent to offset counter 656 which increases its count. In this manner the address output by adder 654 is changed to the next address. Likewise, when the output of AND gate 668 is high, a pulse is sent to the serial output port 700b (or D/A converter 1070) which outputs a data signal from the DFM, and to the sample counter 684 which increases its count.

As mentioned with respect to the input DFM 1060a, the prewired address 48D is written to upon the filling of each buffer of the FIFO. In the preferred embodiment, address 48D is the address of D type flip-flop 667 of the output DFM 1060b. The data (D) input into the D type flip-flop 667 is the msb (bit twenty-three) of the data word accompanying the prewired address. Thus, when the data RAM buffer is half full, the input to the data input of flip-flop 667 is a "1". The value of the msb input to the D input, is then clocked over to the Q output of the flip-flop which is forwarded as the first of two inputs to AND gate 672. AND gate 672 is used to set block 675 which is used to indicate the state of the output DFM 1060b (i.e. is it presently running). If the output DFM 1060b is presently causing data to be read from the data RAM and output via the DFM to the D/A converter 1070 and/or the serial output port 700b, the DFM 1060b is in the running mode and the output from block 675 is already high. As a result, inverter 676 provides a low signal to AND gate 672 which is not affected by the output from flip-flop 667. On the other hand, if the output DFM is not running, the output from block 675 is low, and inverter 676 provides a high value to AND gate 672. Thus, if flip-flop 667 provides a low signal (which will happen until the FIFO in the data RAM for the probe has received enough data to be half full), the output DFM 1060b will not start running. On the other hand, if flip-flop 667 provides a high signal indicating that the data RAM has now been filled halfway, block 675 changes its output and the output DFM 1060b starts running.

It should be noted that when the output DFM 1060b is not running, the high output from inverter 676 is forwarded via OR gate 677 to the clearing input of offset counter 656, thereby causing the address count to be generated by adder 654 to be initialized upon start-up of the DFM.

The remaining blocks of the DFM output section include a FIFO length register 680 and a comparator 686. The FIFO length register 680 stores the full length of the FIFO. When the value of the offset counter 656 is equal to the FIFO length stored in buffer 680, a sync pulse is generated by bus wide XNOR gate 686 which is used to clear the offset counter 656.

Figure 5C:
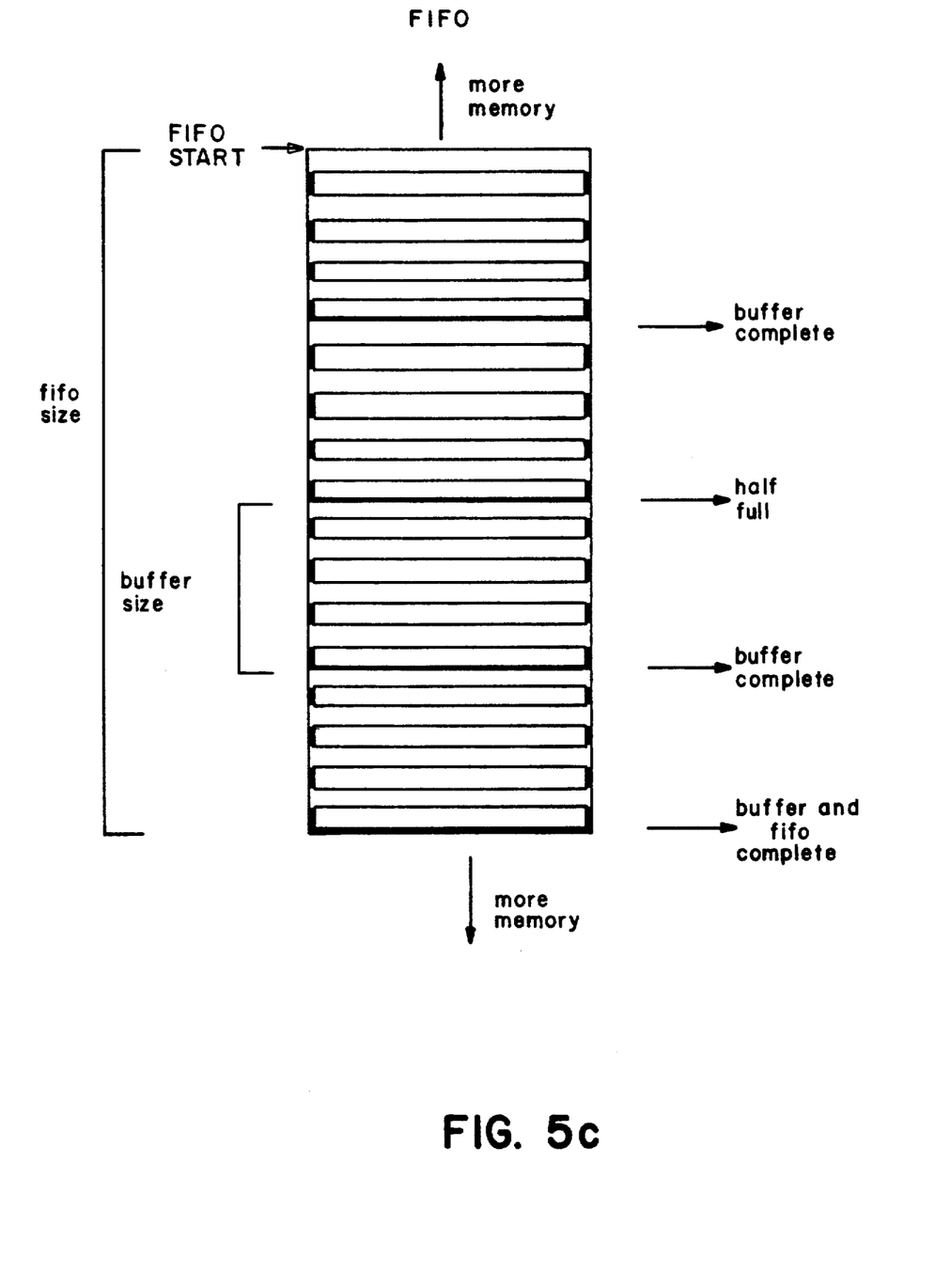
FIG. 5c is a representation of a FIFO which is implemented in the multiported data RAM of the SPROC, and which is utilized by the integrated probe of the invention.

Turning to FIG. 5c, an example of a FIFO associated with the probe DFM is seen. The FIFOs associated with DFMs are contained in a preferably predetermined portion of the data RAM of the processor apparatus. The FIFO of FIG. 5c, as shown contains four buffers. Also as shown, each buffer contains storage for eight data samples. Thus, as shown, the FIFO of FIG. 5c has storage for thirty-two data samples. Of course, a FIFO can contain a different number of buffers, and the buffers can store different numbers of data samples. The size of the each FIFO associated with a DFM and the size of its buffers is either set automatically by intelligent software which calculates the requirements of the particular DFM, or by the user of the processor system during initial programming of the processor system. For initialization of the FIFO associated with the DFM of the probe, preferably, a maximum length is chosen. When the location of RAM to be probed is chosen, e.g. by the user via a computer coupled to the access port, the buffer length is determined and the appropriate information regarding buffer length is written to the appropriate registers of the DFM via the access port. While preferable, the changing of the buffer length in this manner is not required, as a large buffer length will not disrupt the probe. However, an inordinately large buffer will cause some delay.

It will be appreciated by those skilled in the art that the provided integrated probe 1000 of the invention meets all of the objectives of the invention. By obtaining the data from the data RAM bus when data is being written to a RAM location, and by sending and retrieving the information to and from a buffer associated with the probe only when the probe is granted access to the data RAM bus for purposes of writing to the data RAM, the probe does not interfere with the operation of the GSPs. Moreover, because the probe is integral with the SPROC and because it can be used to probe any location of central data RAM memory, the probe is useful in the developing and debugging of the SPROC when the SPROC is being programmed to be a custom digital signal processor. Thus, if circuit parameters are changed via the access port, the change in the output of the circuit, or at any location within the circuit may be viewed in real time. Also, by changing the RAM address being monitored by the data RAM bus comparator, the probe easily jumps from one "location" to another "location" in the "circuit" and provides an analog signal indicative of the signal being generated at the desired locations.

There has been described and illustrated herein a probe for a digital signal processor apparatus. It will be appreciated by those skilled in the art that a method invention for probing a digital signal processor apparatus is related directly to the probe described. It will also be appreciated that while a particular embodiment of the probe has been described, it is not intended that the invention be limited thereto as it is intended that the invention be as broad in scope as the art will allow. Thus, while the probe includes a FIFO or buffer memory which is implemented in the multiported data RAM, the buffer memory could also be implemented as separate memory local to the remainder of the probe circuitry. While such an arrangement is not preferred, as it is easier to implement the buffer in the data RAM which already exists and it is also easier to change the size of the buffer in the data RAM as opposed to a stand-alone memory or FIFO, locating the buffer locally would overcome the necessity of utilizing the time division multiplexed data RAM bus. It would also obviate the need for much of the data flow manager circuitry. Further, particular input and output data flow manager circuitry was described, different circuitry could be utilized. All that is required is that the input data flow manager receive the data from the data RAM bus as dictated by the address comparator and place it in a FIFO, and that the output data flow manager take the data out of the FIFO at the same nominal rate as it is being put in the FIFO. While decimation circuitry is preferably included in the output data flow manager so that the signal being supplied to the D/A converter can be at a rate less than the rate of the data being received by the input data flow manager, such decimation circuitry is not absolutely required for purposes of the invention. Moreover, it will be appreciated by those skilled in the art that in a sample data system, data should be written once and only once in each sample period to the address being probed. In this manner, the FIFO will be filled with valid consecutive data samples, and the D/A output will accurately reproduce the probed node. Therefore, it will be appreciated by those skilled in the art that yet other modifications could be made to the provided invention without deviating from its spirit and scope as so claimed.

We claim:

1. A real time probe for non-interruptingly probing a real time digital signal processor, the real time digital signal processor having a data RAM, a data RAM bus which has address and data lines and is coupled to said data RAM, and at least one processor means coupled to said data RAM, wherein said processor means writes data to and reads data from said data RAM via said data RAM bus, the probe comprising:

a) programmable comparator means for specifying, one at a time, any of a plurality of addresses of said data RAM, said programmable comparator means being coupled to said address lines of said data RAM bus for determining that data is being written to a particular specified address of said data RAM so as to probe said specified address of said data RAM;

b) means for receiving data on said data lines of said data RAM bus when said programmable comparator determines that data is being written to said particular specified address, said means for receiving data having an input coupled to said data lines, and an output;

c) data FIFO means having an input and an output;

d) means for writing coupled to said output of said means for receiving and to said input of said data FIFO means, for writing said data received by said means for receiving to said data FIFO means; and e) means for reading having an input and an output, said input of said means for reading coupled to said output of said data FIFO means for reading said data from said data FIFO means, wherein a copy of data written to said specified address of said data RAM which is being probed as specified by said programmable comparator means is received by said means for receiving, written from said means for receiving to said data FIFO means by said means for writing, and read out from said data FIFO means by said means for reading, wherein said means for reading includes means for providing said copy of data at regular intervals at said output of said means for reading which provides said copy of data as a real time probed signal.

2. A probe according to claim 1 wherein said means for reading has an output, further comprising:

f) a digital to analog converter having an input coupled to said output of said means for reading for receiving said copy of data from said means for reading at said regular intervals and transforming said copy of data into an analog signal.

3. A probe according to claim 2, wherein:
said data FIFO means is implemented in said data RAM, and said data RAM is a multiported data RAM.

4. A probe according to claim 2, wherein:
said data FIFO means is implemented in said data RAM,
said data RAM bus is a time division multiplexed (TDM) data RAM bus having a plurality of time slots which causes said data RAM to be a multiported data RAM, and
said means for writing and said means for reading are allocated at least one of said plurality of time slots to write to and read from said data FIFO means.

5. A probe according to claim 2, wherein:
said means for reading reads data from said FIFO means at a rate equal to a nominal rate at which said means for writing writes said copy of data into said FIFO means.

6. A probe according to claim 4, wherein:
said means for reading reads said copy of data from said FIFO means at a rate equal to a nominal rate at which said means for writing writes said copy of data into said FIFO means.

7. A probe according to claim 6, wherein:
said FIFO means is a variable length buffer.

8. A probe according to claim 2, wherein:
said digital signal processor runs according to a first clock signal at a first data rate, and said means for reading includes decimation means for receiving said first clock signal and dividing said first clock signal to a clock signal of a second rate, wherein said copy of data is received from said FIFO and is provided to said digital to analog converter at said second data rate.

9. A probe according to claim 6, wherein:
said digital signal processor runs according to a first clock signal at a first data rate, and said means for reading includes decimation means for receiving said first clock signal and dividing said first clock signal to a clock signal of a second rate, wherein said copy of data is received from said FIFO and is provided to said digital to analog converter at said second data rate.

10. A probe according to claim 2, wherein:
said probe is integrated with said digital signal processor in a semiconductor substrate.

11. A probe according to claim 6, wherein:
said probe is integrated with said digital signal processor in a semiconductor substrate.

12. A probe according to claim 1, wherein:
said data FIFO means is implemented in said data RAM,
said data RAM bus is a time division multiplexed (TDM) data RAM bus having a plurality of time slots which causes said data RAM to be a multiported data RAM, and
said means for writing and said means for reading are allocated at least one of said plurality of time slots to write to and read from said data FIFO means.

13. A probe according to claim 1, wherein:
said means for reading reads said copy of data from said FIFO means at a rate equal to a nominal rate at which said means for writing writes said copy of data into said FIFO means.

14. A probe according to claim 13, wherein:
said FIFO means is a variable length buffer.

15. A probe according to claim 1, wherein:
said digital signal processor runs according to a first clock signal at a first data rate, and said means for reading includes decimation means for receiving said first clock signal and dividing said first clock signal to a clock signal of a second rate, wherein said copy of data is received from said FIFO and is provided to said digital to analog converter at said second data rate.

16. A method of non-interruptingly probing a real time digital signal processor with a real time probe having address monitoring means, a data FIFO means, a means for receiving digital data, a means for writing digital data to said data FIFO means, and a means for reading said digital data form said data FIFO means, where said digital signal processor has a data RAM, a data RAM bus coupled to the data RAM with address and data lines, and a processing means coupled to said data RAM, said method comprising:
- a) monitoring said address lines of said data RAM bus with said address monitoring means for the occurrence of a specified address, and copying digital data found on said data RAM bus data lines without interrupting said digital signal processor when said monitoring means determines that the specified address has occurred on said address lines;
- b) receiving a copy of said digital data from said data RAM bus data lines with said means for receiving digital data when said digital data is being written to said specified address;
- c) writing said copy of said digital data to said data FIFO means with said means for writing digital data; and
- d) reading said copy of said digital data form said FIFO means with said means for reading digital data, and providing said copy of said digital data at regular intervals at an output of said means for reading digital data at a rate equal to the nominal rate at which said copy of digital data is written to said data FIFO means, wherein said copy of digital data is a real time probed signal.

17. A method according to claim 16, further comprising:
- e) converting said copy of digital data into an analog signal.

18. A method according to claim 16, wherein:
said data FIFO means is implemented in said data RAM, and said data RAM bus is a time division multiplexed (TDM) data RAM bus having a plurality of time slots which causes said data RAM to be a multiported data RAM, such that said means for writing digital data and means for reading digital data are enabled at particular times on said TDM data RAM bus,
said step of writing comprises writing said copy of digital data to said data FIFO means when said means for writing digital data is enabled and said copy of digital data is available, and
said step of reading comprises reading said copy of digital data from said FIFO means when said means for reading digital data is enabled.

19. A method according to claim 18, further comprising:
- e) converting said copy of digital data into an analog signal.

* * * * *